United States Patent

Fremy

[11] Patent Number: 4,473,211
[45] Date of Patent: Sep. 25, 1984

[54] COUPLING WITH VALVE OF THE ROTATING BALL TYPE

[76] Inventor: Raoul Fremy, Residence Carlina 5, Blvd. Colbert, 92330 Sceaux, France

[21] Appl. No.: 402,039

[22] Filed: Jul. 26, 1982

[30] Foreign Application Priority Data

Feb. 15, 1982 [FR] France .................................. 82 02446

[51] Int. Cl.³ .............................................. F16L 37/02
[52] U.S. Cl. .............................. 251/149.2; 251/149.6; 251/149.7
[58] Field of Search ............... 251/149.2, 149.6, 149.7; 137/614.02, 614.03

[56] References Cited

U.S. PATENT DOCUMENTS

| | | | |
|---|---|---|---|
| 2,948,553 | 8/1960 | Gill et al. | 137/614.02 |
| 2,991,090 | 7/1961 | De Cenzo | 137/614.02 |
| 3,078,068 | 2/1963 | Romney | 251/149.2 |
| 3,382,892 | 5/1968 | Cerbin | 137/614.02 |
| 3,423,063 | 1/1969 | Germon | 251/149.9 |
| 3,618,892 | 11/1971 | Sciuto, Jr. | 251/149.2 |
| 4,181,149 | 1/1980 | Cox | 251/149.2 |

Primary Examiner—A. Michael Chambers
Attorney, Agent, or Firm—Cooper, Dunham, Clark, Griffin & Moran

[57] ABSTRACT

A coupling with a rotating ball type valve which comprises a fixed axial shaft placed at the inner end of the body of a coupling connector, directed toward the outlet of the connector and bored to the diameter of the passage of the coupling, the shaft being formed at its end adjacent the inner end of the body with a support surface for a return spring and, at its other end, with a radial flange the two side faces of which are tangent to the outer surface of the shaft, a chamber opening into the spherical shaped sector opposite the passage-closing sector being provided in a spherical closure element, said chamber comprising surfaces cooperating in a sliding contact with the side faces of the flange of the shaft and the axis for driving in rotation the closure element being carried by the flange of the shaft and perpendicular to the flange faces.

8 Claims, 7 Drawing Figures

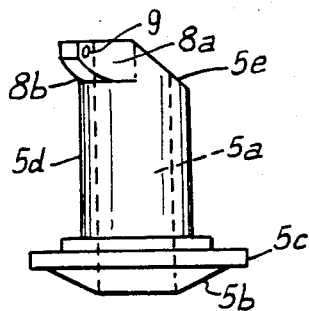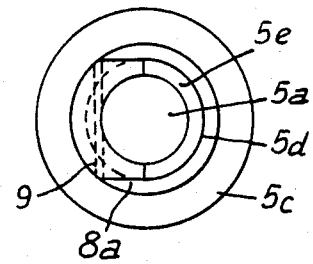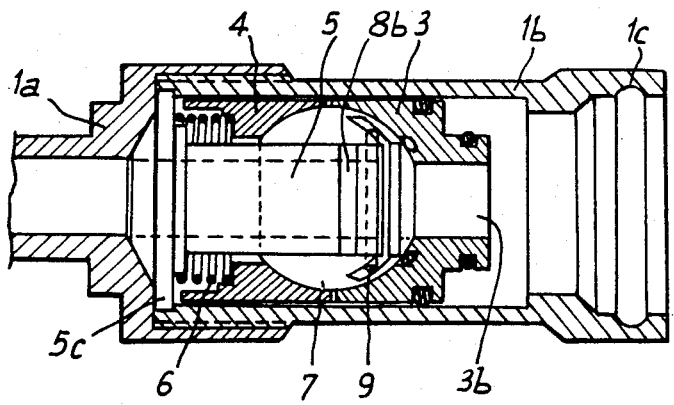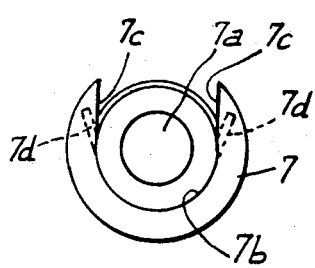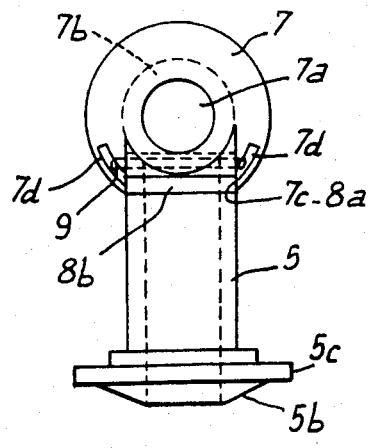

COUPLING WITH VALVE OF THE ROTATING BALL TYPE

BACKGROUND OF THE INVENTION

The present invention relates to couplings for piping, in which a male coupling connector is engaged inside a female coupling connector, the engagement causing the opening of a valve which is provided in one at least of these connectors, the valve being of rotating ball type. In a valve of such type, a closure element, of generally spherical shape, is mounted in a coupling connector with its center in coincidence with the axis of the passage channel for the fluid to be controlled. This spherical closure element, which bears against a seat at the opening of the channel in the valve chamber, has a diametrical bore which, by appropriate means, can be brought into register with the fluid passage channel of the coupling for providing the opening of the valve, or be oriented at substantially 90° to the channel for providing the closing of the valve.

A valve coupling of such type is disclosed particularly in U.S. Pat. No. 4,181,149. In a typical manner, the means providing the rotation of the ball about an axis which is transverse to the axis of the fluid passage channel are constituted by a guiding slide forming an angle with the axis, provided in the spherical closure element, cooperating with a guiding stud rigidly connected to a part which, during the coupling and uncoupling operations, is subjected to a relative longitudinal displacement with respect to the part carrying the seat of the closure element and the closure element itself. An alternative suggested by U.S. Pat. No. 3,078,068 consists in rigidly connecting the axis forming the guiding studs to the spherical closure element and providing the guiding slides for the studs in the part which is subjected to the relative longitudinal displacement.

The interest of valves of such type is that they allow the provision, in the opened position, of a passage of practically constant cross-section if the bore of the closure element has the same cross-section as the fluid passage channel in the coupling connector. Moreover, the passage cross-section is important relative to diameter since, if the spherical closure element rotates through 90°, the diameter of the bore can reach $$d \times \sin\left(\frac{\pi d - 4e}{4d}\right)$$

where d is the diameter of the spherical element and e the width of the arc of the seat support surface, meaning that when e is small, there is obtained with a good approximation a diameter of the bore equal to 0.7d–0.7e. However, with a seat support surface of reduced width, it is necessary to guide the spherical element so that its rotation plane passes through the passage axis and is perpendicular to the stud axis. If this were not the case, there would be a risk that the bore or the valve cap (i.e., the portion of the spherical element providing the closing of the passage) are not coincident with the seat, which would cause leakage. In order to remedy this situation, and as is disclosed in U.S. Pat. No. 4,181,149, guiding means have to be provided, which fix the rotation axis of the spherical closure element. This leads to a complex construction, with the machining on the spherical closure element of secant faces parallel to its plane of rotation and on which are provided the axis stubs defining its axis of rotation, the support surfaces having moreover to be provided in guiding elements sliding in slides. These elements, situated laterally relative to the spherical closure element, increase the diametrical dimensions of the assembly forming the valve and therefore the diameter of the coupling. Moreover, automatism can be achieved only by using a return spring biasing the spherical closure element and the part carrying the seat against the interlocking thrust of the coupling connectors. In U.S. Pat. No. 4,181,149, this thrust is transmitted via the guiding elements of the axis stubs of the closure element or ball and in fact (due to the clearance necessary for the closure element to bear correctly against the seat), via the axis stubs, the ball and the seat. Therefore, the axis stubs are subjected to a high load per surface unit and to a corresponding wear.

SUMMARY OF THE INVENTION

An object of the present invention is to remedy these disadvantages by providing guiding means inside the volume of the spherical closure element and transmitting the thrust of the return spring to the spherical closure element by a support surface in the shape of a spherical cap.

The invention was made possible due to the fact that only a spherical (valve cap) portion of the closure element provides in fact the closure and that only a spherical area sector of about 180°, hereafter called active spherical area sector, is displaced when in contact with the seat.

According to the invention, the valve includes a fixed axial shaft placed at the inner end of the body of the coupling connector, oriented toward the outlet of the coupling and bored to the diameter of the coupling passage, this shaft having at its end corresponding to the inner end of the body a support surface for the return spring and, at its other end, a radial flange the two side faces of which are tangent to the outer surfaces of the shaft. A chamber opening into the spherical area sector opposite the active sector is provided in the spherical closure element, this chamber having surfaces cooperating in sliding contact with the side faces of the shaft flange, and the rotation-driving axis of the closure element being carried by the shaft flange and perpendicular to the aforementioned faces.

According to another feature of the invention and benefitting from the fact that no guiding or rotation-driving member is protruding with respect with the spherical envelope of the closure element, the sealing seat is formed in a hemispherical housing having the diameter of the closure element and provided in the part carrying the seat; and the thrust from the return spring is transmitted by a cylindrical ring surrounding the shaft and terminating in a support surface of spherical shape in continuation of the hemispherical housing of the element carrying the seat.

With the invention, the guiding of the spherical closure element is provided by the spherical interlocking of the ball between the part carrying the seat and the thrust cylindrical ring.

Further features and advantages of the invention will be apparent from the detailed description hereinbelow set forth, together with the accompanying drawings.

BRIEF DESCRIPTION OF THE DRAWINGS

FIG. 3 is a partial sectional view along line III—III of FIG. 2;

FIG. 4 is an elevational view of the shaft;

FIG. 5 is an end view of the shaft;

FIG. 6 is an end view of the spherical closure element along line IV—IV of FIG. 2; and FIG. 7 is a sectional view along line VII—VII of FIG. 1 of the spherical closure element and of the shaft.

DETAILED DESCRIPTION

Figure 1:
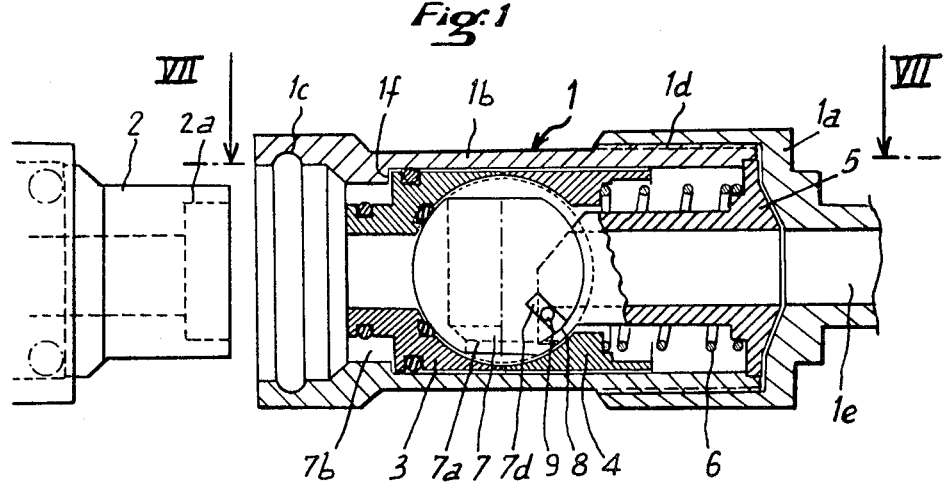
FIG. 1 is a partial longitudinal sectional view of a female coupling connector in the closed position of the valve.

In the drawings, reference numeral 1 designates the body of the female coupling connector, 1a being the socket which includes fixation means on a pipe (such means being of any known type and not shown), 1b being the tubular jacket of the body which carries keying means (constituted here by a groove 1c), with the other connector of the coupling, which is here the male coupling connector 2 shown schematically. The socket 1a and the tubular jacket 1b are assembled by a threading 1d. 1e designates the fluid passage formed in the socket and 1f an inner shoulder at the frontal end of the portion of the tubular jacket, said shoulder defining the outer or frontal limit of the valve chamber. In the valve chamber are housed the seat-carrying part 3, the thrust ring 4, the shaft 5, the return spring 6 and the spherical closure element 7.

The seat-carrying part 3 is a cylindrical ring sliding tightly (owing to a seal 3a) in the valve chamber. It has an axial bore 3b the cross-section of which corresponds to that of passage 1e, the frontal end being cut off in order to form a nose 3c which is received within and engaged by an enlarged bore 2a formed at the end of the male coupling connector 2, tightness being provided by a seal 3d. The opposite or rear face of part 3 is machined in the shape of a hemispherical support surface 3e having the diameter of the closure element 7 and the seat is formed by a seat 3f.

The thrust ring 4 slides freely in the valve chamber, and has an axial bore 4a of sufficient diameter to permit the forward portion of the shaft 5 to extend therethrough. Its front face is machined so as to form a region 4b of spherical contour having the diameter of the closure element 7 and its rear face forms a support surface 4c for the spring 6 which is a helical spring. Surfaces 3e and 4b cooperatively define a spherical housing containing, and closely conforming to, the spherical envelope of the element 7.

The shaft 5 has an axial bore 5a of the same cross-section as passage 1e. Its rear face 5b engages the bottom of socket 1a, i.e., at the inner end of the connector body 1, and is surrounded by a flange 5c which is clamped between the end face of jacket 1b and the bottom of socket 1a. The front face of flange 5c forms a support surface for spring 6. The shaft 5d as such is cylindrical but has at one end a radial flange 8, the two parallel side faces 8a of which are tangent to the outer cylindrical surface of shaft 5d. The rear edge 8b of the radial flange is chamfered in the shape of a sector area so as to permit a sufficient stroke for the shaft head in the spherical housing of the closure element without interfering with the wall of that housing. Likewise, the shaft is chamfered at 5e to enable rotation of the closure element. On the other hand, the shaft head carries an axis stub or pin 9 which is perpendicular to faces 8 and positioned so as to be locatable in the two 45° diametrical planes of the spherical housing (i.e., the two diametrical planes of the spherical housing which intersect the common axis of bores 1e, 5a and 3b at 45°)for the two extreme positions of the valve, viz. that where the seat-carrying part 3 is bearing against the inner shoulder 1f (FIG. 1) and that where it is forced back by engagement with the recessed end of the male coupling connector 2 (FIG. 2).

The spherical closure element 7 has a bore 7a of diametrical axis, the cross-section of which corresponds to that of passage 1e, and a chamber defined by an enlarged bore 7b (coaxial with bore 7a and corresponding to the outer diameter of shaft 5d) and by a cut with parallel faces 7c, the spacing between which is equal to the thickness of the radial flange 8 so that faces 8a can slide gently between faces 7c. The cut defined between faces 7c and the enlarged bore 7b are limited in extent substantially to the extent of penetration of shaft 5 inside the spherical closure element for the opened position of the valve shown in FIG. 2. A cut 7d along a diametrical plane at 45° to the axis of bore 7a is formed in the spherical closure element, this cut 7d being perpendicular to the faces 7c and situated in the radial plane at 45° close to the opening of bore 7a. The width of the cut 7d is substantially equal to the diameter of pin 9 and its depth is at least equal to the height of the spherical cap defined by the plane of the trajectory of pin 9 through the spherical housing formed by parts 3 and 4.

Figure 2:
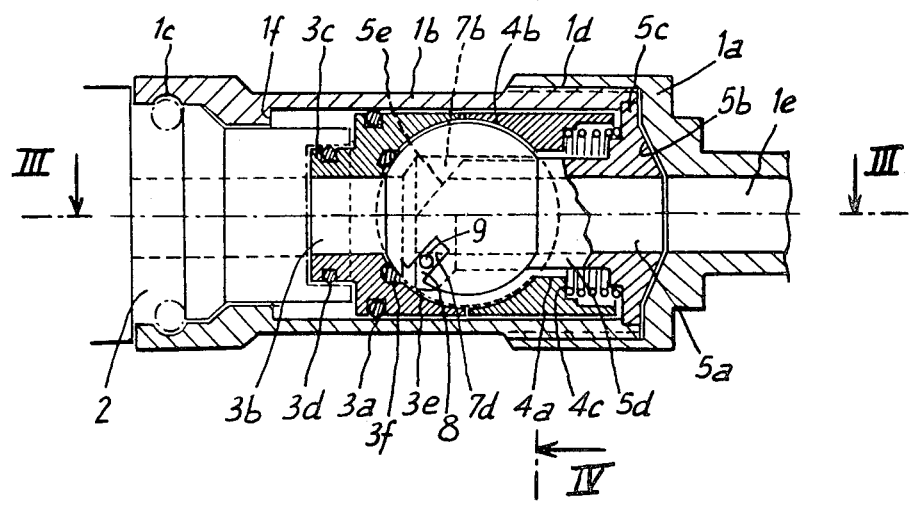
FIG. 2 is a similar view, in the opened positon.

The operation of the described coupling is similar to that of rotating spherical cap devices of the same type, viz., starting from the uncoupled position shown in FIG. 1, the joining together of the coupling being provided by the engagement of the nose of male coupling connector 2 with the nose of the seat-carrying part 3, thereby pushing back the seat-carrying part 3 and the thrust ring 4 against the bias of spring 6. The spherical closure element 7 captured in the housing formed between the seat support part 3 and the thrust ring 4 also moves back, and the pin 9 which is fixed (since it is rigidly connected to the shaft 5) exerts a pressure against the front face of cut 7d, thereby effecting rotation of the spherical closure element until it reaches the position shown in FIG. 2, in which position the bores 3b, 7a, 5a and 1e are in alignment so as to form a straight passage of constant cross-section for the fluid. When uncoupling, the assembly formed by parts 3 and 4 and the closure element 7 is pushed in the opposite direction by spring 6, and pin 9 comes to bear against the rear face of cut 7d in order to rotate the closure element in the reverse direction through 90°, thereby bringing back a solid-spherical cap portion of the element 7 into register with the seat. The two movements are guided with accuracy due to the gentle sliding between faces 8a and 7c.

The preferred embodiment of the valve with spherical closure element according to the invention has been described hereabove, but alternative embodiments are possible without departing from the scope of the present invention. Thus, the pin 9 can be mounted on the ball, with a guiding slot or button-hole preferably perpendicular to the shaft axis and formed in faces 8a. The invention could be applied to a valve with a cylindrical sealing member, the seal of seat 3f can be carried by the spherical sealing element 7, etc.

What is claimed is:

1. A coupling with a rotating ball type valve, in which a closure element of generally spherical shape is mounted in a coupling connector, with its center in coincidence with the axis of the passage channel for the fluid to be controlled, said spherical element bearing against a seat at the opening of the channel in the valve chamber and having a diametrical bore which can be brought into register with the passage channel for the fluid for opening the valve, or be oriented at a sufficient angle to said passage channel to close the valve by obstruction of the passage channel by a cap portion of said spherical element, wherein the valve comprises a fixed axial shaft placed at the inner end of the body of the coupling connector, oriented toward the outlet of the coupling and bored to the diameter of the passage of the coupling, said shaft having at its end adjacent the inner end of the body a support surface for a return spring and, at its other end, a radial flange the two side faces of which are tangent to the outer surface of the shaft, a chamber opening into a spherical shaped sector opposite said cap portion being provided in the spherical closure element, said chamber having facing surfaces cooperating in sliding contact with the side faces of said flange of said shaft and an axis for driving in rotation the closure element being carried by said shaft flange and being perpendicular to said faces.

2. A coupling according to claim 1, wherein the seat is formed in a hemispherical housing having the diameter of the closure element and the thrust from the return spring is transmitted by a cyindrical ring surrounding the shaft and terminating in a support surface in the shape of a sector area in continuation of the hemispherical housing carrying the seat.

3. A coupling according to claim 1 or 2, wherein the seat is formed by a seal surrounding the opening of an axial bore opening into the end of the hemispherical housing.

4. A coupling according to claim 1 or 2, wherein the rear edge of said shaft flange is chamfered in the shape of a sector area.

5. A coupling according to claim 1 or 2, wherein the end of said shaft is chamfered on the side opposite said flange.

6. A coupling according to claim 1 or 2, wherein the shaft head carries a fixed pin perpendicular to said faces, located so as to be in the two diametrical planes at 45° of the spherical enclosure defined by said housing and said ring support surface for the two extreme positions of the valve, and the spherical closure element is formed with a cut along a diametrical plane at 45° to the axis of said bore of said closure element, said cut being perpendicular to the said facing surfaces of said chamber and being situated in the radial plane at 45° close to the opening of said bore of said closure element.

7. A coupling according to claim 1 or 2, wherein the shaft head is formed with a slot or buttonhole substantially perpendicular to the axis of said shaft at the level of said flange and the spherical closure element comprises a fixed pin engaged into said slot or buttonhole and situated in the radial plane at 45° close to the opening of said bore of said closure element.

8. In a coupling connector for mating with another connector to constitute a fluid conduit coupling, a valve comprising:
(a) a connector body defining a cylindrical valve chamber and having an inner end with an axial bore and an open outer end for mating with another connector as aforesaid;
(b) a valve seat member slidably mounted in said chamber for axial movement inwardly from and outwardly to a stop position, adjacent said outer end of said body, said valve seat member having an axial bore and a concave hemispherical inwardly-facing surface including a valve seat portion surrounding the seat member bore;
(c) a thrust ring slidably mounted in said chamber inwardly of said valve seat member for axial movement, with an axial bore and a concave hemispherical outwardly-facing surface cooperatively defining, with said valve seat member surface, a spherical housing;
(d) a shaft, fixedly mounted in said body, extending outwardly through said chamber and said thrust ring bore coaxially therewith into said housing, said shaft having an outer end within said housing and an axial bore communicating with the bore of said body;
(e) a spring within said chamber, under compression between said inner end of said body and said thrust ring, for urging said thrust ring and said valve seat member outwardly;
(f) a generally spherical closure element snugly enclosed within said housing and mounted on said shaft outer end for rotation about an axis of rotation perpendicular to and intersecting the axis of said chamber, said closure element including a cap portion for engaging said valve seat portion to close the valve when the closure element is in a first angular position relative to said shaft, a diametrical bore for register with the bores of the valve seat member, the shaft and the body to open the valve when the closure element is in a second angular position relative to the shaft, and a recess disposed opposite said cap portion in the closure element for accommodating rotation thereof between said first and second positions, said shaft end being surrounded by said closure element; and
(g) means, entirely contained within the spherical envelope defined by the outer surface of the closure element and disposed within said recess, for pivotally interconnecting said closure element and said shaft such that said closure element rotates about said axis of rotation from said first angular position to said second angular position upon inward movement of said valve seat member and said thrust ring against the force of said biasing spring.

* * * * *